(12) United States Patent
Curren

(10) Patent No.: US 7,328,089 B2
(45) Date of Patent: Feb. 5, 2008

(54) SATELLITE IRRIGATION CONTROLLER

(75) Inventor: Scott Curren, Riverside, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/056,830

(22) Filed: Feb. 10, 2005

(65) Prior Publication Data

US 2005/0203669 A1     Sep. 15, 2005

Related U.S. Application Data

(60) Provisional application No. 60/543,504, filed on Feb. 11, 2004.

(51) Int. Cl.
*G05D 7/00* (2006.01)

(52) U.S. Cl. .................. 700/284; 239/69; 137/78.2

(58) Field of Classification Search ............ 700/284, 700/19, 11, 15, 16, 17, 18, 281, 282, 283; 239/69, 63, 70; 137/78.2, 78.3, 624.12
See application file for complete search history.

(56) References Cited

U.S. PATENT DOCUMENTS

| | | | |
|---|---|---|---|
| 5,060,859 A | 10/1991 | Bancroft | |
| 5,097,861 A | 3/1992 | Hopkins et al. | |
| 5,173,855 A | 12/1992 | Nielsen et al. | |
| 5,363,290 A | 11/1994 | Doup et al. | |
| 5,813,606 A | 9/1998 | Ziff | |
| 5,956,248 A | 9/1999 | Williams et al. | |
| 6,016,971 A | 1/2000 | Welch et al. | |
| 6,298,285 B1 * | 10/2001 | Addink et al. | 700/284 |
| 6,647,319 B1 * | 11/2003 | Goldberg | 700/284 |
| 6,823,239 B2 * | 11/2004 | Sieminski | 700/284 |
| 6,892,114 B1 * | 5/2005 | Addink et al. | 700/284 |
| 6,944,523 B2 * | 9/2005 | Addink et al. | 700/284 |
| 2003/0093159 A1 * | 5/2003 | Sieminski | 700/12 |
| 2003/0208306 A1 * | 11/2003 | Addink et al. | 700/284 |
| 2005/0267641 A1 | 12/2005 | Nickerson et al. | |
| 2005/0273205 A1 | 12/2005 | Nickerson et al. | |

* cited by examiner

*Primary Examiner*—Leo Picard
*Assistant Examiner*—Charles Kasenge
(74) *Attorney, Agent, or Firm*—Inskeep IP Group, Inc.

(57) ABSTRACT

In one embodiment, the present invention provides a satellite irrigation controller that allows a user to insert a input/output card into any position in any sequence and be recognized as an input card or an output card. When the correct card type is determined, the card is service according to its specified functionality. In another embodiment, the satellite irrigation controller includes firmware which allows a user to program a range of stations at one time. In yet another embodiment, the satellite irrigation controller provides three user input programs that reduce the amount of input data needed to program the irrigation cycle of an irrigation station.

32 Claims, 10 Drawing Sheets

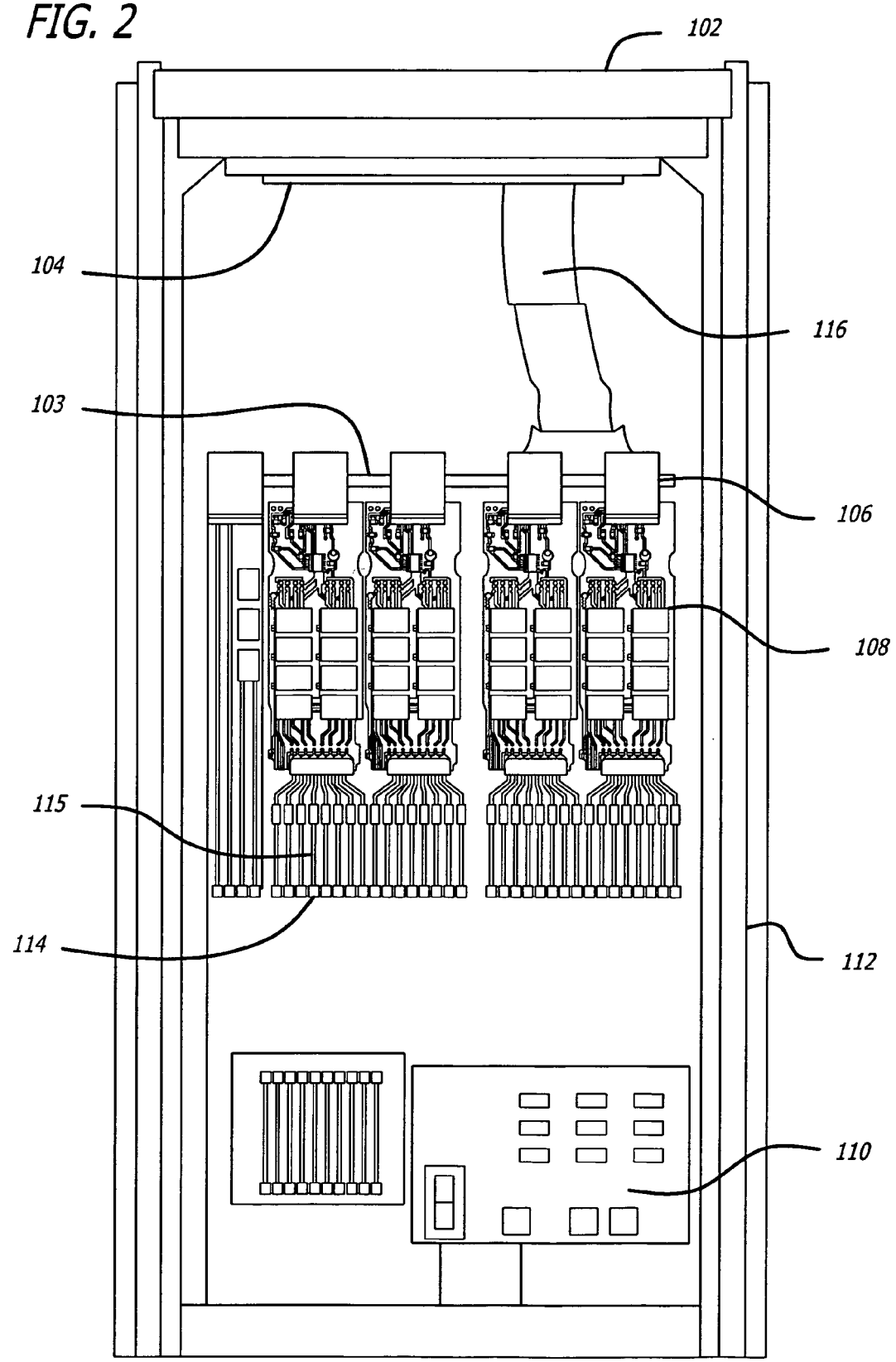

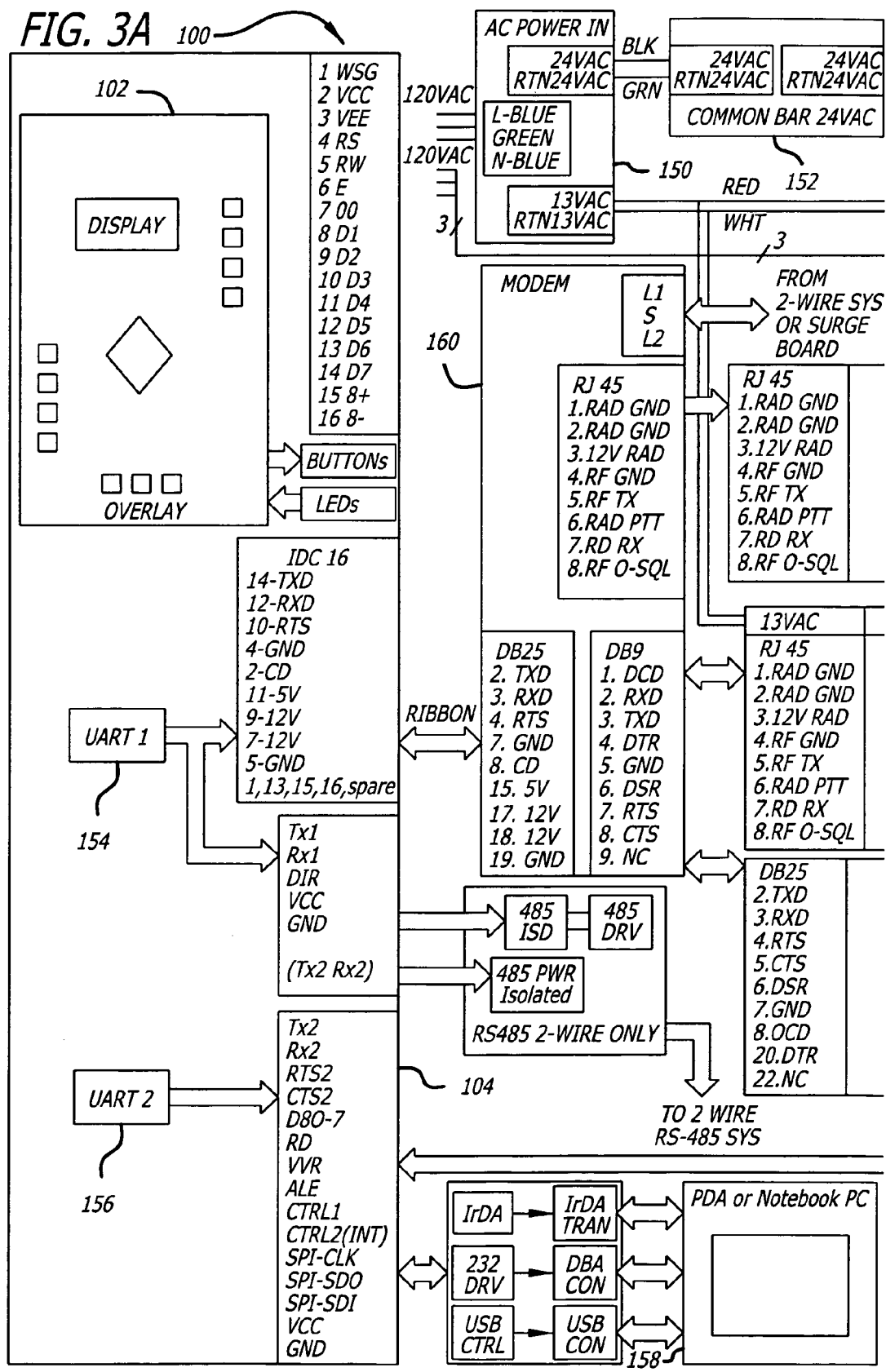

| Irrigation Station # | 1 | 2 | 3 | 4 | 5 | 6 | 7 | 8 | 9 | 10 |
|---|---|---|---|---|---|---|---|---|---|---|
| Run Time (Minutes) | 15 | 15 | 15 | 15 | 15 | 15 | 7 | 4 | 20 | 10 |
| Range | A | A | A | A | A | A | | | | |

FIG. 7A

| Irrigation Station # | 1 | 2 | 3 | 4 | 5 | 6 | 7 | 8 | 9 | 10 |
|---|---|---|---|---|---|---|---|---|---|---|
| Run Time (Minutes) | 15 | 15 | 10 | 15 | 15 | 15 | 7 | 4 | 20 | 10 |
| Range | A | A | | B | B | B | | | | |

SATELLITE IRRIGATION CONTROLLER

RELATED APPLICATIONS

This application claims priority to U.S. Provisional Application Ser. No. 60/543,504 filed Feb. 11, 2004 entitled Satellite Irrigation Controller and is hereby incorporated by reference.

FIELD OF INVENTION

This invention relates to an irrigation controller for controlling the operation of an irrigation system pursuant to a watering schedule that may be programmed by the user. More particularly, this invention relates to an irrigation controller for controlling multiple irrigation stations.

BACKGROUND OF THE INVENTION

Irrigation systems are commonly used to compensate for inadequate rainfall by artificially watering turf or other landscape. In their most basic form, irrigation systems comprise water supply lines that direct water to a group of sprinklers. Each sprinkler is placed at varying positions around the landscape, preferably maximizing the area on which water is disbursed.

Control of each sprinkler is typically left to valves coupled to the water supply lines, preventing or allowing water to flow to each of the sprinkler heads. In some residential and commercial irrigation systems, electrically controlled solenoid valves are operatively connected to a central irrigation controller. These irrigation controllers include a microprocessor with an input interface (such as a dial and buttons) where a user can program a desired watering schedule. When the watering schedule calls for irrigation of at least a portion of the landscape, the irrigation controller causes one or more solenoid valves to open so that water flows to their respective sprinklers. When the schedule calls for an end to the irrigation, the irrigation controller causes the solenoid valves to close, stopping the water flow to the sprinklers.

Large commercial irrigation systems, such as those used for golf courses, generally operate in a similar manner to the previous description. However, the complexity of managing larger irrigation systems increases as the number of sprinklers and the area they irrigate increases. For example, different locations may require dramatically different amounts of water, due to installation of new grass, valleys that collect water, variation in soil composition, or even different grass types. Consequently, additional hardware and software are used for more precise control over the system, increased system reliability, irrigation performance, ease of maintenance, and many other benefits.

In one popular irrigation system arrangement, a central controller is provided which communicates with multiple satellite controllers. Each satellite controller then communicates with solenoid valves either upstream of a group of sprinklers or built into each sprinkler's body for individual sprinkler control. In some systems, users connect the power wires of multiple solenoid valves to one irrigation station terminal on the satellite controller to save wire and conserve irrigation stations. In any of these arrangement, the satellite controller dictates which solenoid valves should be activated for distributing water. Examples of such a prior art irrigation system are disclosed in U.S. Pat. Nos. 4,101,786 and 4,244,022, each of which are incorporated herein by reference in its entirety.

The user operates the irrigation system by programming an irrigation schedule into the central controller which provides a timetable and possibly a set of sensor conditions that must be met for irrigation to occur. This schedule is then communicated to each satellite controller which implements the program for the groups of solenoid valves ultimately connected to it.

Preferably, satellite controllers have a wide range of functionality to allow the user flexibility in how the satellite controller is implemented in the irrigation system. Specifically, the satellite controllers typically have a user interface which allows the user to modify the irrigation schedule for the sprinklers connected to that specific satellite controller and possibly the schedules of other controllers as well. Thus, if the user observes a problem, such as a dry area that requires more water, the irrigation schedule for the problem area can be conveniently modified at the nearby satellite controller, instead of the distant central controller. However, modifying programs for many irrigation stations (i.e. solenoid valves) can be time consuming with the limited user input controls of the satellite controller and the many schedule-programming options available for each station.

Another functionality typically included in satellite controllers is multiple expansion slots for inserting additional station cards. As their name suggests, the station cards provide additional terminals to connect additional solenoid valves, thus expanding the number of sprinklers controlled by the satellite controller. While allowing for convenient station upgrades, prior art satellite controllers require that additional station cards be inserted in ascending slot order (e.g., if slot 1 is filled, an expansion card must be inserted into slot 2). Further, these slots lack the flexibility to alternately accept sensor cards (e.g., a card that connects to a soil moisture sensor).

As a result, there is a long felt need for an improved satellite controller that overcomes the previously described limitations, as well as other limitations not specifically mentioned.

OBJECTS AND SUMMARY OF THE INVENTION

It is an object of the present invention to overcome the limitations of the prior art.

It is a further object of the present invention to provide an improved satellite irrigation controller.

It is another object of the present invention to provide a satellite irrigation controller with universal input/output slots which can accept either a station card or a sensor card.

It is another object of the present invention to provide a satellite irrigation controller that can accept additional station or sensor cards inserted in a non-sequential slot order.

It is another object of the present invention to provide a satellite irrigation controller that allows for quicker modification of multiple irrigation station parameters.

It is another object of the present invention to provide a satellite irrigation controller with simplified schedule program functionality.

The present invention attempts to achieve these objects, in one embodiment, by providing a satellite irrigation controller that allows a user to insert a station output card or sensor input card into any slot in any sequence. The satellite controller interrogates a newly inserted card to obtain card identification data which it matches against a list of known cards. When the correct card type is found, the card is serviced according to its specified functionality.

In another embodiment, the satellite irrigation controller includes firmware which allows a user to program a range of stations at one time. This feature greatly reduces the time necessary to program the irrigation schedule for multiple irrigation stations.

In yet another embodiment, the satellite irrigation controller provides three user input program types that reduce the amount of input data needed to program the irrigation cycle of an irrigation station. By reducing the amount of data the user is required to input, the time to program the irrigation schedule is further reduced.

BRIEF DESCRIPTION OF THE DRAWINGS

FIG. 2 illustrates a side view of the satellite irrigation controller of FIG. 1;

FIGS. 3A-3C illustrate sections of a block chart of the functionality of a satellite irrigation controller;

FIGS. 7A and 7B illustrate irrigation station ranges according to the present invention; and FIGS. 8A-10E illustrate an input display showing various example program settings according to the present invention.

DETAILED DESCRIPTION OF THE INVENTION

Figure 1:
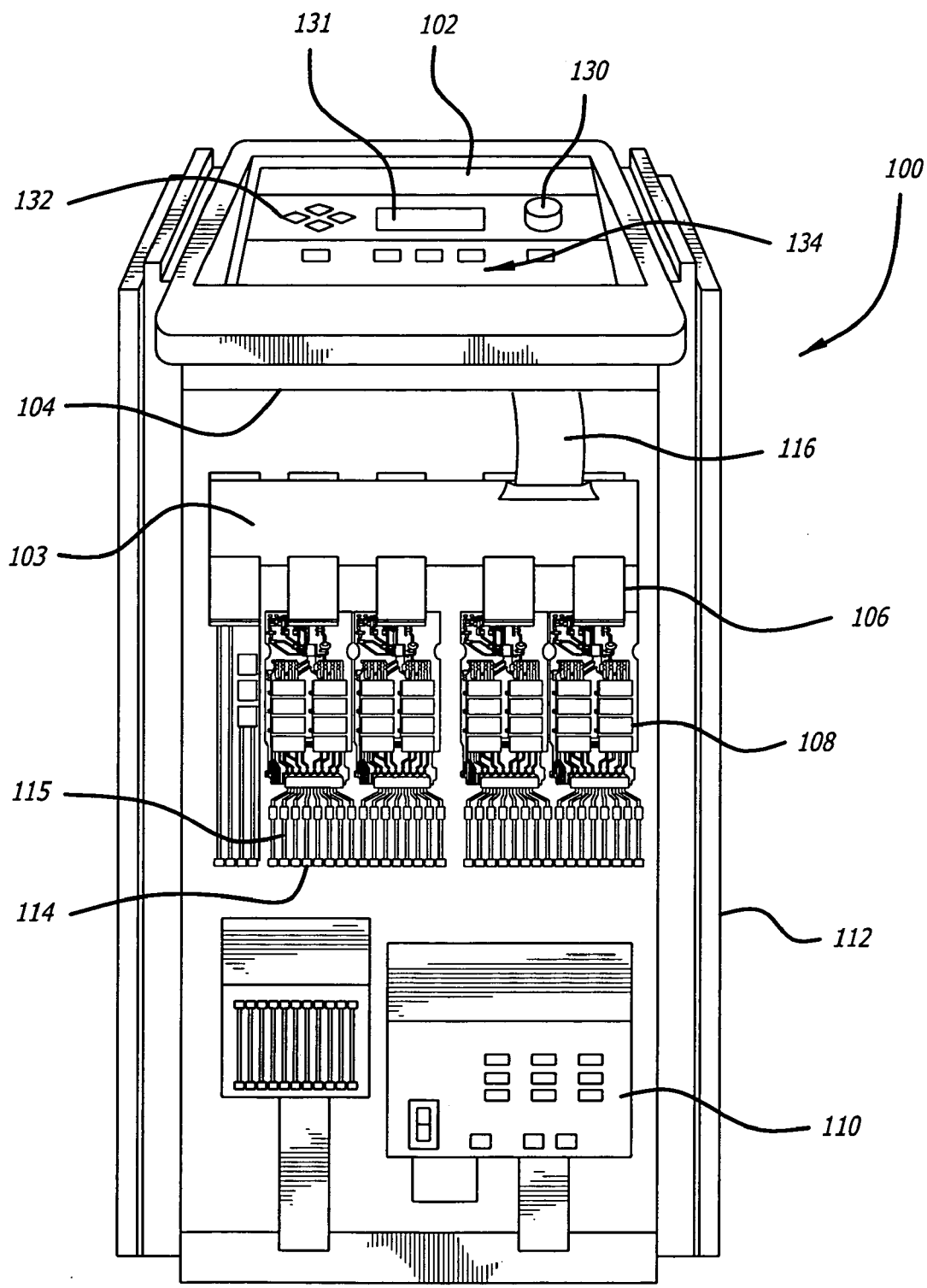
FIG. 1 illustrates a perspective view of a satellite irrigation controller according to the present invention.

In one preferred embodiment of the present invention, a satellite irrigation controller 100 is presented according to the present invention. As seen best in FIGS. 1 and 2, the satellite irrigation controller 100 includes a weather resistant outer case 112 which contains a main board 104, a power distribution board 103, a user interface 102, a power supply 110, and input/output station cards 108 (i.e. input sensor cards or output irrigation station cards).

Figure 6A:
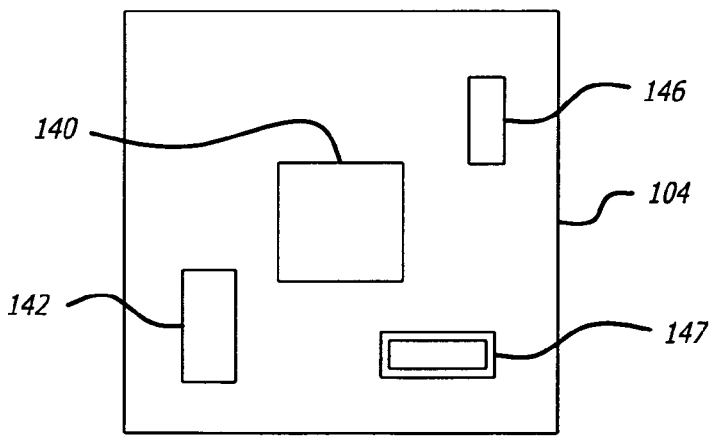
FIG. 6A illustrates a top view of a main electronics board according to the present invention.

As best seen in the simplified illustration of FIG. 6A, the main board 104 in its most basic form includes a CPU 140, memory 142, interface port 146 and power communication port 147. The interface port 146 couples to the user interface 102 which allows the user to interact with irrigation programs stored in memory 142 and run with CPU 140. The main board 104 sends I/O card communication data to communications port 147, through cable 116 and on to a power distribution board 103, seen best in FIGS. 1, 2, and 6B.

The power distribution board 103 is responsible for distributing the communications signals from the main board 104 to the I/O cards 108. The distribution board 103 couples to cable 116 at ports 149 and distributes signals to and from the I/O cards 108 connected by ribbon cables 106 to ports 144. Since each port 144 includes a specified address, the main board 104 can address I/O cards 108 on any of the ports 144. However, these addressing and communications protocols will be further discussed in this application.

The I/O cards 108 receive commands from the main board 104 that direct the cards 108 to act in a specified way. Since the I/O cards 108 may be coupled to irrigation stations, sensors and other similar irrigation equipment, the main board 104 may send a variety of different commands for many different types of I/O cards 108. For example, an I/O card 108 may be directed to turn on an irrigation station, turn off an irrigation station, or obtain a sensor reading.

The satellite controller 100 of the present invention includes three distinct modes of operation. The first mode is a "local mode" where the satellite will not attempt to communicate with a central controller and will, instead, run irrigation programs stored in its own memory 142.

The second mode is a "central" or remotely controlled mode, in which the satellite controller 100 monitors communications over a modem or network for instructions from the central controller. If no such commands from the central controller are present, the satellite controller 100 functions as if set to a local mode, thereby running irrigation programs stored in its own memory 142 or entered from the user interface.

The last mode is an "off" mode which does not water from programs in memory or take instructions from the central controller.

Figure 3B:
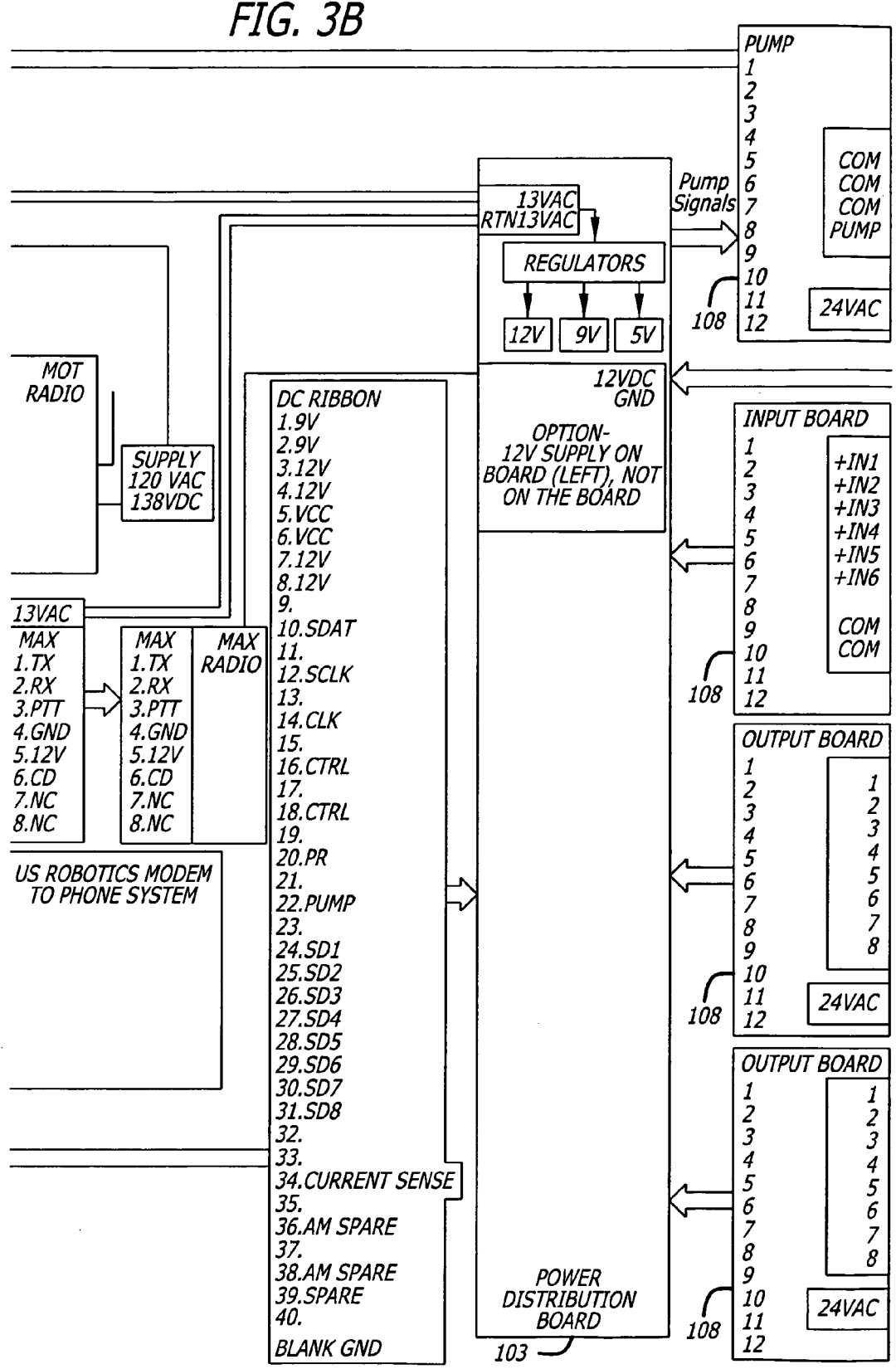
Figure 3C:
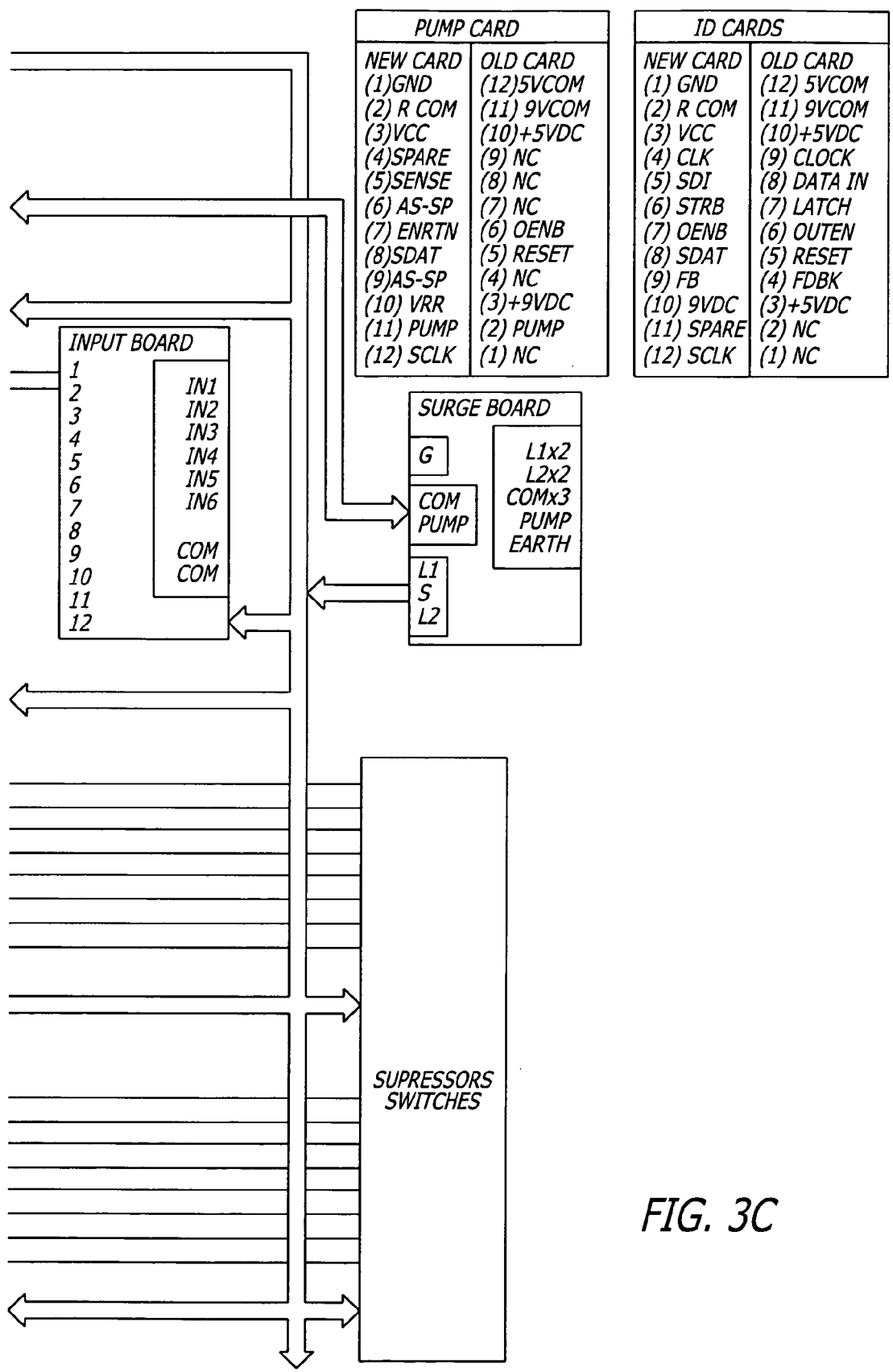

FIGS. 3A-3C illustrate sections of a block diagram overview of the basic functionality of the satellite irrigation controller 100. More specifically, FIGS. 3A-3C provide an overview of power connections to different functional units of the satellite controller 100, such as a modem 160, the power distribution board 103 and I/O cards 108, as well as a basic overview of the communications paths between these functional units within the controller 100. For example, AC power is fed to the satellite controller 100 at AC power in 150 which converts it to 24 VAC, then directs the 24 VAC power to the I/O cards 108. In another example, a first UART 154 (Universal Asynchronous Transmitter-Receiver) communicates with a modem 160, while a second UART 156 communicates with a portable device 158 such as a PDA or Notebook PC.

In a basic sense, the user operates the satellite controller 100 by modifying values in an irrigation scheduling program in the memory 142 of the main board 104. The irrigation scheduling program communicates with the I/O boards 108, through the power distribution board 103, to enact the specified schedule by taking sensor readings, activating an irrigation station, or deactivating an irrigation station. The end result is the fruition of a user specified irrigation schedule.

In one example where the satellite controller 100 is in a local mode, a user may wish to have an irrigation station water its surrounding turf between 3:00 and 5:00 if a water flow sensor detects water pressure within a desired range. The user enters the desired time range and water pressure values for a specified irrigation station into the irrigation program in memory by way of the user interface 102. Once the user is finished entering the data, the CPU 140 and memory 142 run the irrigation program which waits for the specified time (3:00) to first check that the water pressure sensor value falls within the user specified range, then communicates a signal to the I/O card 108 of the specified irrigation station to begin watering the surrounding turf. Once the time range has ended (5:00), the irrigation program causes a communication signal to again be sent to the I/O card for the specified irrigation station, directing the station to stop irrigation.

Universal Card Positions

As previously described, prior art satellite controllers have required different slots or connection positions for different types of cards. For example, output station cards were required to be positioned and connected to the main board only at certain ports while input sensor cards must be positioned and connected to the main board only at other ports. Additionally, cards were required to be added to sequential ports (e.g. position 1, then position 2, then position 3).

The present invention eliminates these limitations by providing universal card positions which recognize different types of input/output cards 108 at any card connection ports (i.e. cards added to sequential ports or non-sequential ports). In this respect, the process of adding further input/output cards 108 is simplified and the possibility of improper configuration is greatly reduced.

Figure 6B:
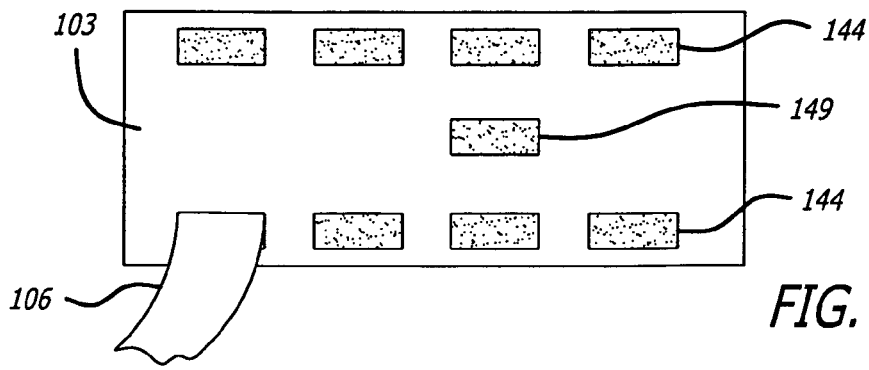
FIG. 6B illustrates a top view of a power distribution board according to the present invention.

As seen in FIGS. 1, 2, and 6B, the satellite irrigation controller 100 of a preferred embodiment includes eight card positions (four on the visible side of FIGS. 1 and 2 and four more on the hidden opposing side) including corresponding I/O connection ports 144 on the power distribution board 103 to accommodate the input/output cards 108. Each I/O card 108 is physically secured to an inner framework inside the outer case 112 and connected to one of the I/O ports 144 on the power distribution board 103 by ribbon cable 106.

Figure 4:
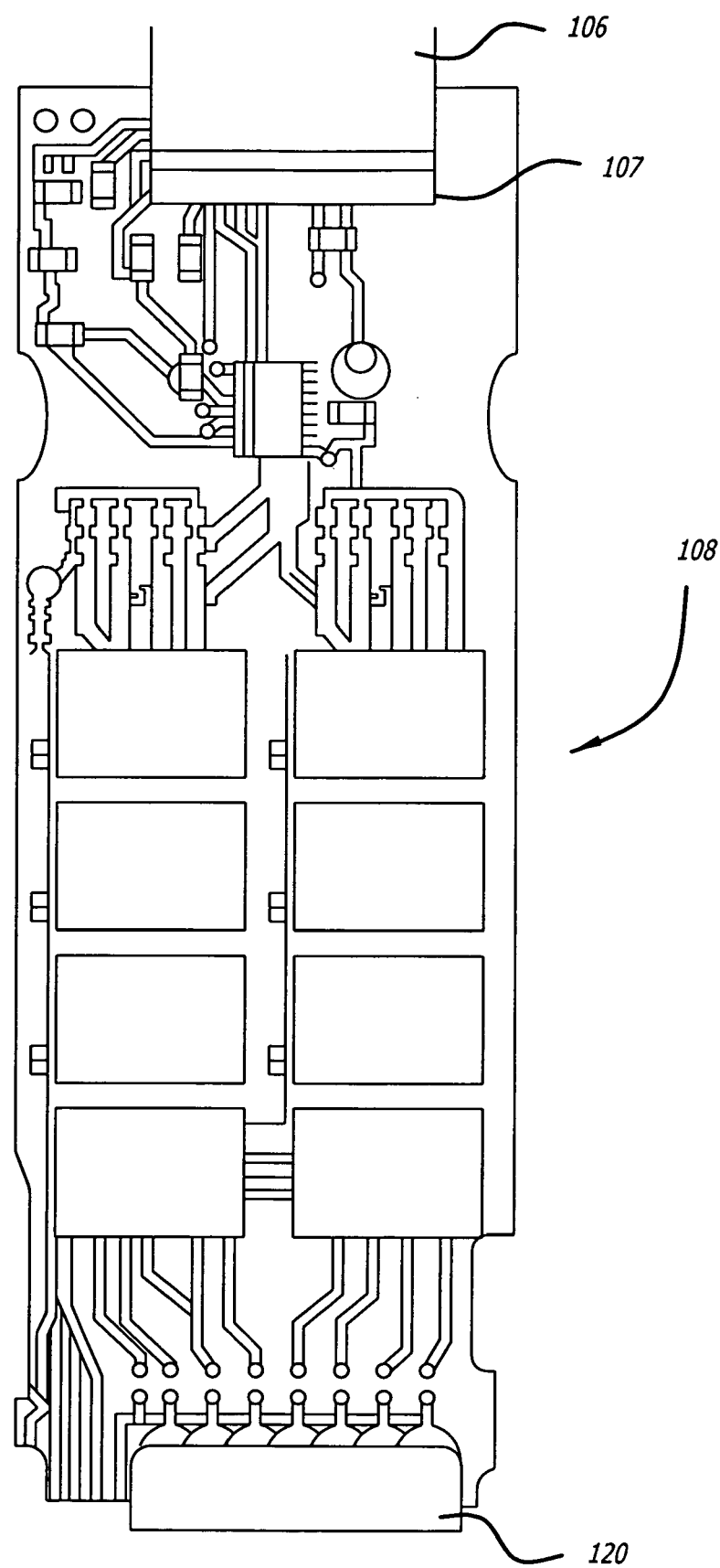
FIG. 4 illustrates a top view of an irrigation station card according to the present invention.
Figure 5:
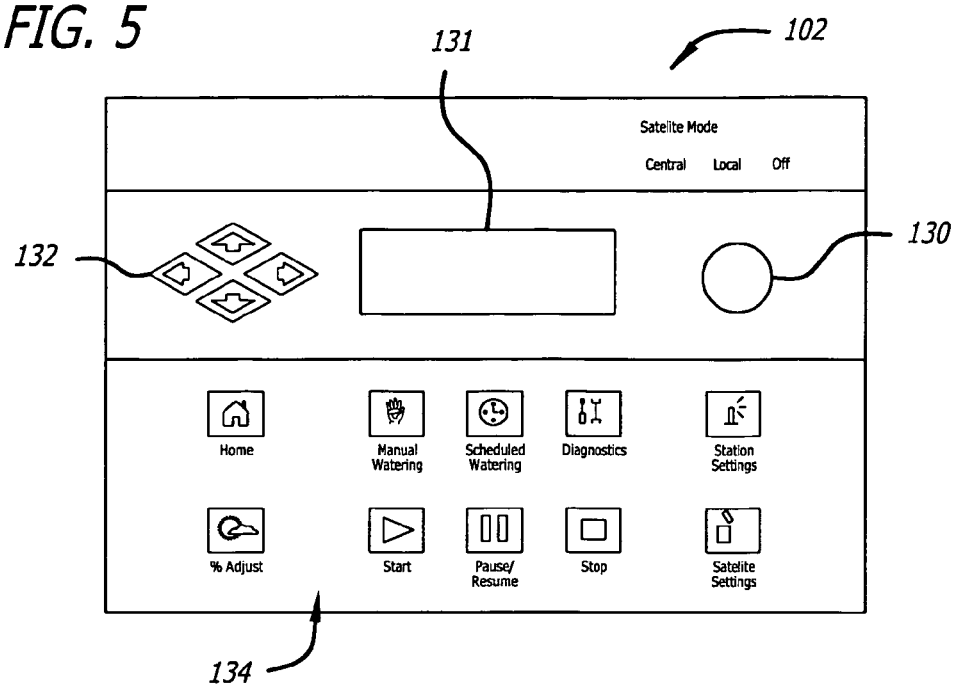
FIG. 5 illustrates a top view of an user input panel according to the present invention.

A typical I/O card 108 can be seen in FIG. 4 to include a data port 107 and an adapter port 120. The data port 107 sends and receives data to and from the power distribution board 103, while the adapter port 120 connects to an adapter card, such as a station adapter card 115, as seen in FIGS. 1 and 2. The station adapter card 115 provides a set of terminals 114 where additional irrigation stations can be connected. Other adapter cards may provide sensor terminals or other connections, depending on the functionality of the I/O card 108.

Returning to the power distribution board 103, multiple interface protocols are simultaneously used to recognize the presence of different types of I/O cards 108 connected to the I/O ports 144. Each type of I/O card 108 responds to a different protocol, allowing the main board 104 to match up this response to a list of different types of I/O cards 108. Once the type of I/O card 108 is determined, the I/O card 108 can be further interrogated and controlled based on its known functionality. In this respect, the type of I/O card 108 is recognized and thereby controlled by the main board 104.

For example, two independent interface protocols may be simultaneously used with a 12-pin embodiment of the I/O port 144 to distinguish between an I/O card 108 for irrigation stations or an I/O card 108 for sensors: a shift register protocol and an I$^2$C protocol, the general operation of which is known to those of ordinary skill in the art. Although both protocols attempt to initiate contact with the I/O card 108 at the same time or possibly near in time, only one protocol will be able to communicate with the card since input cards utilize different protocols than output cards.

Specifically, in one preferred embodiment, the shift register protocol is used with station output cards (such as an 8-station irrigation output card) while the I$^2$C protocol is used with all other input cards. In this respect, when a station output card is connected to the communications port 144 of the power distribution board 103, the main board 104 senses a return data signal from the shift register and thereby recognizes this card as a station output card. On the other hand, when a sensor input card is connected to the communications port 144, the main board 104 senses a return I$^2$C signal and thereby recognizes this station card as in input card.

Once the main board 104 determines if the connected card is an input card or an output card, it can further interrogate the protocol for additional information about the card. Specifically, each card type has a different address that can be compared to a predetermined list of addresses in the memory of the main board 104, allowing the main board 104 to service that card according to the address stored in the memory.

For example, the communications port on a sensor input card using the I$^2$C protocol can be interrogated by the main board 104 through the I$^2$C protocol to determine what kind of sensor card the input card is (e.g., a rain sensor card, flow sensor card, soil moisture sensor card, etc.). At this point, the main board 104 obtains specified data from the sensor card (e.g., the cards address) and utilizes it as specified by the information stored in the main board 104 for that address.

The shift register protocol as used herein operates in a manner generally similar to a conventional shift register so as to move a serially ordered data set into a discrete number of storage locations (i.e., moving data from the main board 104 into the memory of the I/O card 108). This is accomplished by making use of 5 signals on 5 of the different pins of the I/O port 144: CLK, SDI, SDO, ENABLE, and LATCH.

The data from the main board 104 is clocked in to the I/O card 108 using the SDI and CLK signals, as in a conventional shift register protocol. Specifically, the SDI signal contains the irrigation station data and the CLK signal contains a clock signal. The two signals are sent together so that the each bit of data in the SDI signal has a counterpart clock signal. The data (e.g. if each irrigation station should be turned on or off) is shifted into a shift register structure with 8 "slots" or data positions. As each new bit of data enters the shift register, the oldest bit of data in the register is shifted out and sent on the SDO line back to the main board 104. In this respect, the main board 104 sends new irrigation station data to an I/O card position, and then listens for a response. If a response is sent back, the main board 104 determines that the communication port 144 is connected to a properly operating I/O card 108, and more specifically an irrigation station output card.

The two remaining signals of this protocol are used to actuate on/off commands for each irrigation station of the I/O card 108. When the LATCH signal is received by the I/O card 108 from the main board 104, it causes the I/O card 108 to update switches for each irrigation station from the shift register that determine if each station is on or off.

When the ENABLE signal is being sent, the I/O card 108 enables each of the irrigation stations to function according to how each of their switches are set. For example, if the switch for station 1 is set to on, and the switch for station 2 is off, the ENABLE signal causes the I/O card 108 to send an activating electrical signal to irrigation station 1 to cause irrigation, while no such signal is caused for irrigation station 2. However, if the ENABLE signal is not sent to the I/O card 108, all irrigation stations will be prevented from operating. Thus, the ENABLE signal is the "green light" that gives the I/O card 108 the final approval before causing activation of specified irrigation stations.

In summary, the main board 104 detects the presence of an irrigation station output card connected to a communications port 144 by sending clocked data on the SDI line or pin. If an irrigation station output card is present, this clocked data will be shifted into memory and the old data in the memory shift register is sent back to the main board 104 on the SDO line. Thus, the main board 104 sends data and gets a recognized response which confirms that an output card is connected to the specific communications port 144.

The I$^2$C protocol uses the SCLK, SDAT and SDI signals to interrogate and communicate with input sensor cards connected to the ports 144. This is performed near in time to the previously described shift register protocol.

Initially, the SDI signal is used to attempt to assign addresses to each card slot or communications port 144. The SDI signal is asserted for only one particular port 144 at a time. If a sensor card is present in that port 144, the sensor card sends a response signal back to the main board on the SDAT line (for the data) and SCLK line (for clocking the data). The main board 104 therefore recognizes that a sensor input card is connected to communications port 144 if a response is received on the SDAT and SCLK lines and assigns a unique communications address to that I/O card 108 via the SDAT and SCLCK lines.

Once the input sensor card 108 is recognized by the main board 104 and has a unique address, further communications between the two can occur. Specifically, the main board 104 sends data with the I²C protocol by including the unique communications address of a particular I/O card 108 in the data messages. The data is transmitted to all communications ports 144 over the SCLK and SDAT lines, however, only the I/O card 108 with the proper address will accept this data (e.g., sensor reading requests or sensor data). In this way, the main board 104 sends and receives data from an addressed I/O board 108.

It should be noted that in this example, all 8 I/O ports 144 allow for an I/O card 104 to be plugged into any I/O port 144 in any sequence and be properly recognized and serviced. Thus, I/O cards 104 are not required to be inserted sequentially (a first card in port 1, a second card in port 2, etc.).

In this respect, the satellite controller 100 of the previous example determines what type of I/O card 108 is connected to any of the I/O ports 144. These features of the preferred embodiment of the present invention further reduce the chances of misconfiguring the satellite controller 100 and therefore are likely to produce a more stable and reliable satellite controller 100.

Station Ranges

In another preferred embodiment of the present invention, the satellite controller 100 includes irrigation schedule programming software which allows the user to program a particular attribute for a range of irrigation stations. Prior art satellite controllers 100 required a user to input a specific attribute individually for each irrigation station, often calling for considerable time and concentration by the user to fully program the satellite. The station range feature of the present invention eliminates repetitive programming of stations, saving the user time and energy.

In one preferred embodiment of the present invention, the satellite controller 100 includes a software algorithm which continuously sorts all consecutive irrigation stations into ranges and displaying these ranges on the user interface. Specifically, the algorithm searches for two or more consecutive irrigation stations that have the same run times and assigns those irrigation stations a unique range ID. Normally, the irrigation program information is stored in nonvolatile memory, such as EEPROM. However, a copy of this program data is copied into the volatile RAM of memory 142 to allow the algorithm to quickly access and modify this data. In this respect, the range algorithm constantly monitors the irrigation program data, or at least constantly monitors this data when the user sets the satellite controller to an irrigation programming mode, and automatically creates ranges of irrigation station.

This range algorithm allows a user to initially create a range by assigning consecutive irrigation stations the same runtime. The algorithm then recognizes these similar runtimes and assigns each of them the same unique range ID. At this point, the user may adjust the irrigation time for all units in the range at once. Since large irrigation areas such as golf courses typically have large regions with the same turf type, it is desired for many of the sprinklers to have the same irrigation time. Station ranges, therefore, can save potentially large amounts of time that would otherwise have been spent programming multiple irrigation stations.

For example, a user may wish to group irrigation stations 1-6 into a range for future irrigation schedule programming use. The user enters the irrigation schedule programming mode with the user interface 102 and adjusts the runtime for stations 1-6 to 15 minutes. The range algorithm, which is continually monitoring the runtime values of the irrigation stations, recognize that the consecutive irrigations stations 1 through 6 have the same runtimes of 15 minutes. The range algorithm then assigns irrigation stations 1 through 6 a unique range ID, Range A.

Once irrigation stations 1 through 6 have been assigned to Range A, the irrigation schedule programming mode displays Range A similarly to an irrigation station, so that the user can modify the irrigation runtime for all of the irrigation stations in that range. By modifying the runtime of Range A, the runtime for irrigation stations 1 through 6 are similarly modified, thus reducing the time the user would have spent to modify the variables for each irrigation station separately.

However, if a user wishes to modify the runtime of a single station within a range, that entire range is not destroyed. Instead, the range is separated into two distinct ranges. Specifically, since the range algorithm is constantly monitoring the runtime values for all of the irrigation stations, including stations that currently belong to ranges, the algorithm becomes aware of a change in the runtime of an irrigation station within a range and reassigns new range ID's based on consecutive irrigation stations with the same runtimes. In other words, by altering the runtime of an irrigation station in a range, the range algorithm "looks again" to find any remaining ranges that could be created from the modified irrigation schedule.

FIG. 7B illustrates the example data of FIG. 7A where the Run Time of Irrigation Station 3 has been modified from 15 minutes to 10 minutes. Next, the range algorithm becomes aware of the change in runtime for station 3 and reassigns range ID's. Since consecutive stations 1 and 2 have the same runtimes, the algorithm assigns them the range ID of Range A. Likewise, since consecutive stations 4 through 6 have the same runtimes, the algorithm assigns them the range ID of Range B. In this respect, modifying the runtime of an irrigation station within a range (i.e., assigned a range ID) "interrupts" the range and thereby automatically creates two smaller ranges.

Further to this point, a user may interrupt a range multiple times with the range algorithm continually recreating ranges according to its preset rules, namely assigning ranges to consecutive irrigation stations with the same runtimes. Thus, if a range can be created after a runtime modification, the algorithm will assign range ID's. Thus, even as ranges decrease in size, the satellite controller 100 will require less time for a user to program than prior art models.

FIG. 8B illustrates how such a range is preferably implemented within the user interface. Stations 02 through 05 each have the same runtime and are therefore grouped together in a group intuitively named "02-05". The user may subsequently adjust the irrigation stations of this range as if they were a single irrigation station, reducing the apparent complexity of an irrigation schedule to the user.

Watering Programs

In yet another preferred embodiment of the present invention, the irrigation schedule programming software includes three types of irrigation programs having different predetermined aspects to reduce the time required to program an irrigation cycle. For simplicity, these programs will be referred to as Basic, Grow-in, and Advanced. Preferably, the satellite controller 100 allows at least 64 different irrigation schedules, with the option that each schedule can be set to Basic, Grow-in, and Advance, thereby reducing programming time for each schedule.

The first program type, Basic, is the simplest program for the user, having the least amount of variables to enter before the program will commence. Thus, the user can quickly program a simple irrigation schedule for a group of irrigation stations.

To maintain simplicity, the Basic program type only requires a few input settings from the user while the other irrigation aspects are predetermined. For example, the Basic program type only requires the user to enter a start time, a runtime, a percentage run time adjustment, and a number of simultaneous stations that can run at once. Each of these settings are discussed in further detail below.

The start time setting determines when the irrigation cycle will begin. The user enters the desired start time into the irrigation schedule program which ultimately allows the irrigation program to compare the start time value against an internal clock. When the internal clock reaches the desired start time value, the irrigation program commences irrigation according to the program.

The irrigation station runtime value determines the length of time each irrigation station irrigates. The user enters a number of minutes corresponding to an irrigation station or a range of irrigation stations which provides the irrigation program with a time limit to stop watering the turf around specified stations.

The percentage runtime adjustment modifies all of the station run times by the same specified percentage. The user simply enters a percentage value into the percentage runtime adjustment of the irrigation program by way of the user interface. The irrigation program multiplies the percentage by the runtime value for each irrigation station to get each irrigation station's new runtime.

For example, the irrigation stations may initially be set to water for 10 minutes, but the user determines that the irrigated turf requires more water and so enters 150% as the percentage runtime adjustment value. The irrigation program multiplies 150% by the runtime of the first irrigation station, which is 10 minutes, to get the new runtime value of 15 minutes. This process is performed for every irrigation station runtime value. Thus, each of the irrigation station runtimes are easily increased by modifying the percentage runtime adjustment.

The simultaneous station number represents the maximum number of irrigation stations that can be turned on simultaneously. Since water pressure in an irrigation piping system decreases as more irrigation stations are turned on, each irrigation system is able to support a different number of simultaneously watering irrigation stations before sprinkler performance is adversely affected. To this end, the satellite controller 100 allows the user to limit the number of simultaneously watering sprinklers and therefore prevent low water pressure from affecting sprinkler performance.

The user simply inputs into the program the maximum number of irrigation stations that can be simultaneously turned on. The irrigation program then limits the irrigation schedule to only turn on that maximum number of irrigation stations or possibly fewer during an irrigation cycle. Since that maximum number will likely be less than the total number of irrigation stations in the system, the irrigation program will schedule groups of irrigation stations to water in consecutive shifts until all of the irrigation stations have watered their respective turf areas.

After receiving the previously described irrigation program values from the user, the Basic irrigation program determines the remaining irrigation program values needed to produce a simple irrigation schedule. Specifically, the program determines or assumes irrigation schedule parameters that a user would otherwise need to input into a standard irrigation program. For example, the Basic irrigation programs determines that the schedule will not be repeated multiple times in one day, active watering days are assumed to be every day, and the maximum simultaneous stations are assumed to be used at the same time. This way, additional parameters may be assumed by the Basic program to create a simple irrigation schedule that requires little time for the user to create.

For example, FIGS. 8A and 8B illustrate the contents of a user interface display 131 in the programming mode of the Basic irrigation program. By manipulating the dial 130 and buttons 132 and 134, the user can modify program settings to desired values in order to create a desired program. Specifically, FIG. 8A illustrates a first "page" of the program display with a percentage runtime adjustment of 150%, a start time of 9:05 am and a 5-minute runtime for station 01. Scrolling down to the second "page", FIG. 8B shows that station ranges 02-05 are set to a 10-minute runtime while station 6 is set to a 7-minute runtime. Finally, 10 irrigation stations may operate simultaneously. With these values, the satellite controller 100 will run the basic program which begins to water at 9:05 am with stations 01-06 for runtimes 50% greater than those set for each station.

The irrigation controller 100 also includes a Grow-in program type which includes additional user programmable variables over the Basic program type. These input variables facilitate programming repeated irrigation cycles within a specified time period to produce increased turf growth.

For example, the Grow-in program includes user inputs for a percentage runtime adjustment, start time, end time, runtime, delay between cycles, and the number of simultaneous stations that can run at once.

The percentage runtime adjustment, start time, runtime, and the number of simultaneous stations operate as previously discussed in reference to the Basic irrigation program. The delay between cycles parameter, also known as a soak time, allows the user to enter a time value into the irrigation program with the user input 102 which the irrigation program then uses as a timed delay value between each irrigation cycle. In this respect, the user can create an irrigation schedule that repeats after a relatively short time so as to provide additional water and therefore quickly grow the surrounding turf. The program will thus keep repeating until the end time is reached.

FIGS. 9A-9C illustrate the interface display 131 of the user interface 102 displaying an example Grow-in irrigation program. FIG. 9A shows the first display "page" with the percentage runtime adjustment set to 100%, the start time set to 9:05 am, and the end time set to 4:00 pm. Scrolling down to the second "page" of the program displayed in the interface display 131, the number of simultaneous stations are set to 1, station 07 is set to run for 30 minutes, and the soak time (or delay between cycles) is set to 10 minutes. Finally, the last "page" of the irrigation program shows stations 06-10 set to a 30 minute runtime with a 10 minute soak time. These program settings are then implemented by the irrigation program to create an irrigation schedule that begins at 9:05 am to begin watering on station 07 for 30 minutes, then stations 06-10 for 30 minutes, waiting 10 minutes before starting this cycle over again. At 4:00 pm, the irrigation schedule ceases all irrigation.

The irrigation controller 100 also includes an Advanced irrigation program type which requires even more user programmable variables than the Grow-in program type. The additional variables allow more flexibility in determining an irrigation schedule, yet still provides predetermined irrigation schedule values to reduce the time needed to create an irrigation schedule.

For example, the Advanced program type includes user inputs for a percentage runtime adjustment, start times, end times, runtimes, active irrigation days, number of times schedule should be repeated, and the number of simultaneous stations allowed to run. The percentage runtime adjustment, start time, end time, runtime, and the number of simultaneous stations operate as previously discussed in reference to the Basic and grow-in irrigation programs. The active irrigation days setting can be similarly entered through the user input 102 to specify which days of the week the program should run. For example, the satellite controller 100 could be programmed to irrigate only on Monday, Wednesday and Friday. Alternatively, the satellite controller 100 could be programmed to water every third day.

FIGS. 10A through 10F illustrate various views of the input display 131 presenting various "pages" of display of the Advanced irrigation program. FIGS. 10A and 10B show alternative example program settings for the Advanced irrigation program which allow the user to determine the Days the irrigation schedule will be run. Specifically, FIG. 10A shows individual days for two weeks in which the user can specify to activate the watering schedule. In this example, the irrigation will occur on Monday, Wednesday, and Friday. On the other hand, FIG. 10B shows numbered day intervals in which the user can specify watering to occur, for example once every four days.

FIGS. 10C-10E illustrate alternative values for repeating irrigation cycles in a schedule. In FIG. 10C the Repeats are set to continuous, which instructs the irrigation program to continuously repeat the schedule without end on active days. FIG. 10D illustrates the Repeats value set to autocycle which also repeats the irrigation schedule until the maximum cycle time (set elsewhere in the irrigation program) is reached. Finally, FIG. 10E illustrates the Repeats value set to 02, which directs the irrigation program to repeat the programmed schedule twice, then cease all irrigation.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A satellite irrigation controller comprising:
    a controller housing;
    a circuit board disposed on said controller housing, said circuit board having a CPU and a memory, said CPU configured to execute an irrigation program, a first communication protocol, and a second communication protocol;
    a user interface coupled to said circuit board and further configured to modify irrigation data associated with said irrigation program;
    a first I/O port operatively coupled to said circuit board, said first I/O port configured to interchangeably receive an input card and an output card; and
    wherein said input card communicates with said first communication protocol and said output card communicates with said second communication protocol.

2. The satellite irrigation controller of claim 1, wherein said input card is a sensor card.

3. The satellite irrigation controller of claim 1, wherein said output card is an irrigation station control card.

4. The satellite irrigation controller of claim 1, wherein said first I/O port is configured to interchangeably receive an input card and an output card with a ribbon cable.

5. The satellite irrigation controller of claim 1, wherein said first communication protocol is an $I^2C$ protocol.

6. The satellite irrigation controller of claim 1, wherein said second communication protocol is a shift register protocol.

7. A method of detecting an I/O card of a satellite controller comprising:
    providing a satellite controller comprising a circuit board having a CPU, a memory, a first protocol for communicating with said CPU and a second protocol for communicating with said CPU;
    creating a communicative connection between an I/O card and said CPU;
    transmitting at least one of said first protocol and said second protocol from said CPU to said I/O card; and,
    determining a type of said I/O card based on a response from the transmitting of at least one of said first protocol and second protocol between said CPU and said I/O card.

8. The method of claim 7, wherein transmitting a first protocol includes transmitting an $I^2C$ protocol and wherein transmitting a second protocol includes transmitting a shift register protocol.

9. The method of claim 8, further comprising determining that said I/O card type is an input card in response to the transmitting of said $I^2C$ protocol.

10. The method of claim 8, further comprising determining that said I/O card type is an output card in response to the transmitting of said shift register protocol.

11. The method of claim 7, further comprising executing an irrigation program by said CPU.

12. The method of claim 7, further comprising:
    adding at least one additional I/O card to communicate with said CPU;
    transmitting at least one of said first protocol and said second protocol from said CPU to said at least one additional I/O card; and,
    determining a type of said additional I/O card based on a response from the transmitting of at least one of said first protocol and second protocol.

13. An irrigation controller comprising:
    a circuit board having a CPU and a memory;
    an irrigation program stored in said memory and executable by said CPU;
    a user interface coupled to said circuit board for inputting at least one irrigation parameter into said irrigation program;
    a routine included in said irrigation program which isolates all irrigation stations having a common value for said at least one irrigation parameter into a range of irrigation stations associated with said irrigation program; and, said irrigation program enabling said user to treat said range as a single irrigation station during future adjustments by said user to said irrigation program.

14. An irrigation controller according to claim 13, wherein said at least one irrigation parameter is the run time of said irrigation station.

15. An irrigation controller according to claim 13, wherein said user interface includes a display and wherein said range is displayed on said display.

16. An irrigation controller according to claim 13, wherein said routine divides said range into multiple ranges upon determining a change in said at least one irrigation parameter of at least one irrigation station in said range.

17. An irrigation controller according to claim 13, wherein said routine assigns said range with a unique identifier.

18. A method of setting up an irrigation program comprising:

providing a circuit board having a CPU and a memory;

inputting irrigation parameters of a plurality of irrigation stations into said memory;

isolating a plurality of irrigation stations into a range of irrigation stations based on a commonality in the value of at least one irrigation parameter; and, treating said range of irrigation stations as one irrigation station in future inputting of irrigation parameters for said irrigation stations within said range such that a change in said irrigation parameter for one irrigation station within said range results in a change to said irrigation parameter for all irrigation stations within said range.

19. A method according to claim 18, wherein inputting irrigation parameters includes inputting a run-time.

20. A method according to claim 18, wherein the isolating of a plurality of stations includes isolating a plurality of irrigation stations based on a common value in the run-time of said irrigation stations.

21. A method according to claim 18, further comprising assigning an identifier to said range.

22. A method according to claim 18, further comprising the dividing of said range into a plurality of ranges based on the change of said irrigation parameter in one of said irrigation stations within said range.

23. A method according to claim 18, further comprising displaying to a user the identity of said range.

24. An irrigation controller comprising:

a controller housing;

a microprocessor disposed in said controller housing;

a memory disposed in said controller housing and operatively coupled to said microprocessor; and, an irrigation scheduling program within said memory, said irrigation scheduling program having a plurality of default irrigation routines selectable by a user, each of said default irrigation routines being distinguished from another of said default irrigation routines by the number of different input data types required from a user in order to render said irrigation scheduling program executable.

25. An irrigation controller according to claim 24, wherein said plurality of default irrigation routines includes at least three default irrigation routines.

26. An irrigation controller according to claim 24, wherein said plurality of default irrigation routines includes a basic default program, a grow-in default program and an advanced default program.

27. An irrigation controller comprising:

a controller housing;

a microprocessor disposed in said controller housing;

a memory disposed in said controller housing and operatively coupled to said microprocessor; and, an irrigation scheduling program within said memory, said irrigation scheduling program having a plurality of default irrigation routines selectable by a user, each of said default irrigation routines being distinguished from another of said default irrigation routines by the number of inputs required from a user in order to render said irrigation scheduling program executable wherein said plurality of default irrigation routines includes a basic default program, a grow-in default program and an advanced default program; and, wherein the inputs required from a user in said basic default program include start time, runtime, percentage runtime adjustment, and maximum number of simultaneously running stations.

28. An irrigation controller comprising:

a controller housing;

a microprocessor disposed in said controller housing;

a memory disposed in said controller housing and operatively coupled to said microprocessor; and, an irrigation scheduling program within said memory, said irrigation scheduling program having a plurality of default irrigation routines selectable by a user, each of said default irrigation routines being distinguished from another of said default irrigation routines by the number of inputs required from a user in order to render said irrigation scheduling program executable wherein said plurality of default irrigation routines includes a basic default program, a grow-in default program and an advanced default program; and, wherein the inputs required from a user in said grow-in default program include start time, runtime, percentage runtime adjustment, maximum number of simultaneously running stations and delay time between cycles.

29. An irrigation controller comprising:

a controller housing;

a microprocessor disposed in said controller housing;

a memory disposed in said controller housing and operatively coupled to said microprocessor; and, an irrigation scheduling program within said memory, said irrigation scheduling program having a plurality of default irrigation routines selectable by a user, each of said default irrigation routines being distinguished from another of said default irrigation routines by the number of inputs required from a user in order to render said irrigation scheduling program executable wherein said plurality of default irrigation routines includes a basic default program, a grow-in default program and an advanced default program; and, wherein the inputs required from a user in said advanced default program include start time, end time, runtime, percentage runtime adjustment, maximum number of simultaneously running stations, active irrigation days and schedule repeats.

30. A method of programming an irrigation controller comprising:

providing a CPU and memory having a programmable irrigation program;

selecting a default irrigation routine from a plurality of default irrigation routines, each of said default irrigation routines being distinct from another of said default irrigation routines according to the number of required user inputs;

inputting said required user inputs for said selected default irrigation routine; and, executing said default irrigation routine;

wherein the inputting of said required user inputs includes inputting start time, runtime, percentage runtime adjustment, and maximum number of simultaneously running stations.

31. A method of programming an irrigation controller comprising:

providing a CPU and memory having a programmable irrigation program;

selecting a default irrigation routine from a plurality of default irrigation routines, each of said default irrigation routines being distinct from another of said default irrigation routines according to the number of required user inputs;

inputting said required user inputs for said selected default irrigation routine; and, executing said default irrigation routine;

wherein the inputting of said required user inputs includes inputting start time, runtime, percentage runtime adjustment, maximum number of simultaneously running stations and delay time between cycles.

32. A method of programming an irrigation controller comprising:

providing a CPU and memory having a programmable irrigation program;

selecting a default irrigation routine from a plurality of default irrigation routines, each of said default irrigation routines being distinct from another of said default irrigation routines according to the number of required user inputs;

inputting said required user inputs for said selected default irrigation routine; and, executing said default irrigation routine;

wherein the inputting of said required user inputs includes inputting start time, end time, runtime, percentage runtime adjustment, maximum number of simultaneously running stations, active irrigation days and schedule repeats.

* * * * *